United States Patent
Sugiyama et al.

(10) Patent No.: US 12,523,575 B2
(45) Date of Patent: Jan. 13, 2026

(54) METHOD AND APPARATUS FOR COLLECTING BACTERIA

(71) Applicant: HITACHI HIGH-TECH CORPORATION, Tokyo (JP)

(72) Inventors: Kiyotaka Sugiyama, Tokyo (JP); Hiroko Fujita, Tokyo (JP); Tsuyoshi Sonehara, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 281 days.

(21) Appl. No.: 18/278,483

(22) PCT Filed: Mar. 31, 2021

(86) PCT No.: PCT/JP2021/013764
§ 371 (c)(1),
(2) Date: Aug. 23, 2023

(87) PCT Pub. No.: WO2022/208703
PCT Pub. Date: Oct. 6, 2022

(65) Prior Publication Data
US 2024/0133774 A1   Apr. 25, 2024
US 2024/0230479 A9   Jul. 11, 2024

(51) Int. Cl.
*G01N 1/10* (2006.01)
*B04B 13/00* (2006.01)
*C12Q 1/06* (2006.01)
*C12Q 1/24* (2006.01)
*G01N 1/40* (2006.01)
*B04B 5/02* (2006.01)

(52) U.S. Cl.
CPC .................................... *G01N 1/10* (2013.01)

(58) Field of Classification Search
CPC ........ G01N 1/10; G01N 1/4077; B04B 13/00; B04B 5/02; C12Q 1/24; C12Q 1/06; Y02A 50/30
USPC .................................... 422/533, 527, 547, 548
See application file for complete search history.

(56) References Cited

U.S. PATENT DOCUMENTS

2012/0053041 A1* 3/2012 Ihm ..................... B01L 3/5021
                                                      494/37
2020/0355588 A1   11/2020 Niimi et al.

FOREIGN PATENT DOCUMENTS

| CN | 209564643 U | * 11/2019 | ............ G01N 30/06 |
| JP | 2015-017850 A | 1/2015 | |
| WO | 2019/097752 A1 | 5/2019 | |

OTHER PUBLICATIONS

Lenah Bashir et al., "Direct Detection of Methicillin Resistant Staphylococci: Comparison of Phenotypic Methods with Multiplex PCR and Direct Susceptibility Testing", Journal of Advances in Microbiology, 20(2), Mar. 12, 2020, p. 48-60, Article No. JAMB.55159.

(Continued)

*Primary Examiner* — Laura Martin
*Assistant Examiner* — Anthony W Megna Fuentes
(74) *Attorney, Agent, or Firm* — MATTINGLY & MALUR, PC

(57) ABSTRACT

The present invention relates to a method, a kit and an apparatus for pretreatment of bacterial test. More specifically, the present invention relates to a method, a kit, and an apparatus for continuously performing separation of blood cells and bacteria from a sample containing impurities such as blood cells, destruction of blood cells, and collection of bacteria.

11 Claims, 13 Drawing Sheets

(56) References Cited

OTHER PUBLICATIONS

International Search Report of PCT/JP2021/013764 dated Jun. 29, 2021.
Extended European Search Report received in corresponding European Application No. 21934872.9 dated Oct. 1, 2024.
Malenfant, Dylan J et al., "A simple and efficient centrifugation filtration method for bacterial concentration and isolation prior to testing liquid specimens with laser-induced breakdown spectroscopy", Spectrochimica Acta Part B, Jun. 5, 2019, vol. 158, New York, NY.
Paulick, Alexnadra E et al., "Concentration of bacterial specimens during centrifugation prior to laser-induced breakdown spectroscopy analysis", Spectrochimica Acta Part B, pp. 68-75, Jun. 5, 2019, vol. 157.

* cited by examiner

A                    B

A    B

METHOD AND APPARATUS FOR COLLECTING BACTERIA

TECHNICAL FIELD

The present invention relates to a method, a kit and an apparatus for pretreatment of bacterial test. More specifically, the present invention relates to a method, a kit, and an apparatus for continuously performing separation of blood cells and bacteria from a sample containing impurities such as blood cells, destruction of blood cells, and collection of bacteria.

BACKGROUND ART

Sepsis is a highly lethal infection, and it is important to provide appropriate treatment rapidly. In determination of sepsis, a blood culture test is commonly performed, in which whether bacteria are present in blood that is a sterile sample is determined. A smear test is typically performed thereafter, then a sample of a positive blood culture is subjected to separation culture, then an identification test for identifying the type of bacteria is performed on the obtained colony, and a sensitivity test for measuring the sensitivity of the bacteria to an antimicrobial agent is performed. In the above series of tests, one day is required for the blood culture test, one day is required for the separation culture, and one day is further required for the sensitivity test. Thus, a total test time of two to three days is required. Thus, it currently takes two to three days to determine whether treatment with an appropriate antimicrobial has been performed, and the lethality becomes extremely high when an ineffective antimicrobial has been administered.

First, in the blood culture test, a very small number of bacteria of about 10 CFU/mL (CFU: colony forming unit) contained in the case of sepsis is grown in a culture bottle. Culture is performed typically for about 8 hours to overnight, and bacteria are allowed to grow until a gas component or the like generated through growth of bacteria reaches a detectable level. Thus, it is known that $10^6$ to $10^{10}$ CFU/mL of bacteria are contained in the culture bottle with a positive blood culture. The concentration of bacteria in a positive blood culture varies depending on the condition of the blood of a patient, bacterial species, blood culture test apparatus, and the like, and thus, the concentration takes a wide range as described above. The main components other than bacteria in the blood culture bottle are blood cell components, a medium and resin, beads, activated carbon, and the like that adsorb antibiotics. In particular, the concentrations of red blood cells and white blood cells present in blood are high and are about $10^9$ cells/mL and $10^7$ cells/mL, respectively, which are equal to or higher than the concentration of bacteria.

In the separation culture, which is performed next, a sample of the positive blood culture is applied to an agar medium to grow colonies. By preparing a bacteria liquid from the colony, a sample that is free of impurities other than bacteria and has a bacterial concentration (typically, $10^5$ to $10^6$ CFU/mL) necessary for the sensitivity test can be obtained.

In the sensitivity test, which is performed at the end, a certain concentration of an antimicrobial agent is typically introduced into the bacteria liquid containing bacteria, and the proliferation degree of the bacteria is determined according to the concentration of the antimicrobial agent. It is important to prepare a bacteria liquid having a certain bacterial concentration in advance because the result of the sensitivity test will vary otherwise. The above is a series of flow of the sensitivity test, and regarding the sensitivity test, research to speed up the time until the end of the test is currently in progress. A current gold standard test detects the proliferation degree of bacteria by using a change in turbidity, and it takes a whole day and night for the test. Currently, a method for more rapidly determining turbidity change using laser light, a method for rapidly determining the proliferation degree of individual bacteria with a microscope, a method for rapidly quantifying the proliferation degree of bacteria with ATP luminescence, and the like are being developed, and the time required for the sensitivity test may be shortened to about several hours. On the other hand, as a process for preparing a bacteria liquid, a method of performing separation culture requiring one day and diluting colonies in a liquid is still used.

Here, if it is possible to remove, for example, blood cell components and impurities contained in the culture medium other than bacteria from the sample of a positive blood culture without performing the step of separation culture and to produce a bacteria liquid having a certain concentration of $10^5$ to $10^6$ CFU/mL in a short time, separation culture is unnecessary, and the time required for sensitivity test is further shortened.

To solve such a problem, PTL 1 discloses a method in which blood cells are subjected to degradation by a protease and expansion treatment with a hypotonic solution, and only blood cell components are selectively destroyed using a surfactant. This series of processing can sufficiently destroy and remove blood cell components. However, since many repeated centrifugal separation steps and washing steps by solution replacement are included and it takes about 30 minutes to 1 hour for the treatment, it is difficult to test many specimens with high throughput.

NPL 1 discloses a method for collecting bacteria from a blood sample by changing the acceleration of centrifugal separation. Specifically, first, centrifugation is performed at a low centrifugal acceleration to separate blood cell components and plasma components containing bacteria, and pipetting is performed, and then centrifugal separation is performed at a high centrifugal acceleration, then pipetting is performed for collecting bacteria. Compared with PTL 1, the method of NPL 1 is greatly simplified, but in practice, it is difficult to completely remove blood cell components only by performing centrifugal separation once at a low centrifugal acceleration, and it is often necessary to perform cleaning a plurality of times in actual operation. In addition, since the centrifugation and the pipetting operation are performed step by step by an operator or an apparatus, in practice, many discontinuous procedures such as centrifugation, opening of a container, pipetting, discharging, closing, centrifugation, opening of the container, and pipetting, are required. Thus, it is still difficult to test many specimens required to be measured at irregular intervals in parallel with high throughput.

PTL 2 discloses a method for recovering bacteria from blood by centrifugal separation using a plurality of drugs and a container for the method. The container disclosed in PTL 2 has a structure in which a plurality of containers containing different drugs along the direction of centrifugation are connected by a channel narrower than the container, in which blood cell components are continuously destroyed while bacteria are precipitated by centrifugation. Thus, the method of PTL 2 enables an efficient test as compared with PTL 1 and NPL 1. On the other hand, when the concentration of a bacteria liquid is adjusted using an optical method, a washing step is separately required because a plurality of drugs are used to destroy blood cells in a sample and it is highly possible that they affect the growth of bacteria, and it is difficult to exclude a substance that absorbs light of a specific wavelength of a component (for example, hemoglobin or the like) in the contents of the destroyed blood cells.

CITATION LISTS

Patent Literatures

PTL 1: US 2020/0355588 A (WO 2019/097752 A)
PTL 2: JP 2015-017850 A

Non-Patent Literature

NPL 1: Bashir, L. et al., Journal of Advances in Microbiology Vol. 20, pp. 48-60, 2020

SUMMARY OF INVENTION

Technical Problem

The methods disclosed in PTL 1 and NPL 1, in which methods for collecting bacteria from a blood sample are disclosed, require discontinuous treatments because a plurality of times of centrifugal separation and washing are repeated, and thus, the methods have problems that it takes 30 minutes or more for treatment and it is difficult to test many specimens with high throughput. In the method disclosed in PTL 2, in which a method for collecting bacteria by continuously treating a blood sample is disclosed, there has been a demand for further improvement of bacterial growth and operability.

An object of the present invention is to provide a method and an apparatus for continuously performing separation of blood cells and bacteria from a blood sample, destruction of blood cells, and collection of bacteria by a simple and stable method.

Solution to Problem

As a result of intensive studies by the inventors of the present invention to solve the above problems, it has been found that separation of blood cells and bacteria from a blood sample, destruction of blood cells, and collection of bacteria can be continuously performed rapidly and simply by subjecting a first container provided with a fine through hole in a side wall and containing a blood sample and a second container enclosing the through hole and containing a reagent (surfactant) together to centrifugal separation, to separate blood cells and bacteria in the first container, and then releasing the bacteria to the second container through the through hole. In particular, it has been found that separation of blood cells and bacteria from a blood sample, destruction of blood cells, and collection of bacteria can be continuously performed more simply by performing centrifugation first and then gradually changing the centrifugal acceleration to release bacteria to the second container.

That is, the present invention provides, in a first aspect, a method for collecting microorganisms, the method including:
 a step of introducing a sample into a first container having at least one through hole in a side thereof;
 a step of having the through hole of the first container enclosed within and connected to a second container;
 a first separation step of performing centrifugation on the first container and the second container with a first centrifugal force to separate the sample into a solution containing microorganisms and a solution containing blood cells; and
 a second separation step of discharging the solution containing microorganisms from the through hole to the second container to collect the solution containing microorganisms in the second container.

In a second aspect, the present invention provides a method for determining a proliferation degree of microorganisms contained in a sample, the method including the steps of:
 collecting microorganisms contained in a sample by the method in the first aspect;
 preparing a microbial liquid having a target concentration by using the microorganisms that are collected; and
 determining a proliferation degree of the microorganisms by using the microbial liquid.

In a third aspect, the present invention provides a kit (for example, a kit for use in collection of microorganisms) comprising:
 a first container into which a sample is to be introduced, the first container having at least one through hole in a side thereof; and
 a second container having a part into which a reagent is to be introduced,
 in which the through hole of the first container is enclosed within and connected to the second container.

In a fourth aspect, the present invention provides a microorganism collecting apparatus comprising:
 a centrifuge configured to perform centrifugation on a first container and a second container together; and
 a control unit configured to control centrifugal force of the centrifuge,
 in which
 the first container comprises at least one through hole in a side thereof, and a sample is to be introduced into the first container,
 the second container is configured to enclose and connect to the through hole of the first container, and
 the control unit is configured to control the centrifugal force of the centrifuge to perform:
 a first separation using a first centrifugal force that separates the sample introduced into the first container into a solution containing microorganisms and a solution containing blood cells, and
 a second separation using a second centrifugal force greater than the first centrifugal force, the second separation causing the solution containing microorganisms to be discharged from the through hole of the first container to the second container following the first separation.

Advantageous Effects of Invention

According to the present invention, it is possible to continuously perform separation of blood cells, destruction of blood cells, and collection of bacterial components from a sample (for example, a sample of a positive blood culture) in which bacteria, blood components, culture medium components, and the like are mixed, and thereafter, it is possible to prepare a bacterial sample having a target concentration and perform determination of proliferation.

According to the present invention, after a blood sample is introduced into a container, bacteria components are collected by performing a series of centrifugal separation operation once at a predetermined centrifugal acceleration. Cleaning or pipetting with a reagent by a user or another apparatus is unnecessary, and many specimens can be rapidly tested in parallel with high throughput. In addition, since blood cells and bacteria are separated by a method using centrifugal separation without using any reagent, the influence of a reagent on the growth of bacteria is small, stable collection free from influence from bubbles or the like, and concentration adjustment by an optical method can be correctly performed because the influence of hemoglobin or the like is reduced, and determination of proliferation can be performed.

Other features related to the present invention will become apparent from the description of the present specification and the accompanying drawings. Problems, configurations, and effects other than those described above will be clarified by the following description of the embodiments. The description of the present invention is merely exemplary and is not intended to limit the claims or application examples in any way.

DESCRIPTION OF EMBODIMENTS

Figure 1:
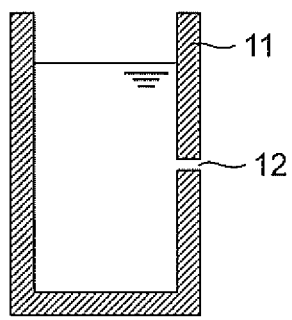
FIG. 1 is a sectional view of an example of a container with a fine through hole.

The present invention relates to a method, a kit, and an apparatus for collecting microorganisms from a sample containing blood cells such as blood. Specifically, a first container having a through hole in a side thereof is subjected to centrifugal separation together with a second container enclosing the through hole of the first container, and after blood cell components in a sample and a component containing microorganisms are separated in the first container, the component containing microorganisms is released to the second container through the through hole, whereby microorganisms are collected in the second container. This configuration makes it possible to easily and rapidly collect microorganisms from a sample containing blood cells. Hereinafter, a specific description will be given.

The present invention provides, in an aspect, a method for collecting microorganisms, the method including:
a step of introducing a sample into a first container having at least one through hole in a side thereof;
a step of having the through hole of the first container enclosed within and connected to a second container;
a first separation step of performing centrifugation on the first container and the second container with a first centrifugal force to separate the sample into a solution containing microorganisms and a solution containing blood cells; and
a second separation step of discharging the solution containing microorganisms from the through hole to the second container to collect the solution containing microorganisms in the second container.

The "microorganism" to be collected refers to various kinds of microorganisms including bacteria, actinomycetes, fungi, and the like. However, the microorganism does not include a virus. Specifically, the microorganisms may include microorganisms to be detected by a sterile test method in the pharmacopoeia, and microorganisms such as pathogenic bacteria and pathogenic fungi to be tested in a hospital laboratory or the like. Example thereof include bacteria and fungi such as *Escherichia* (specific examples include *Escherichia coli*), *Staphylococcus* (specific examples include *Staphylococcus aureus* and *Staphylococcus epidermidis*), *Propionibacterium* (specific examples include *Propionibacterium acnes*), *Micrococcus*, *Streptococcus* (specific examples include *Streptococcus pyogenes* and *Streptococcus pneumoniae*), *Enterococcus* (specific examples include *Enterococcus faecium* and *Enterococcus faecalis*), *Neisseria* (specific examples include Phosphorus bacteria and *Neisseria meningitides*), *Moraxella*, *Shigella* (specific examples include *Shigella dysenteriae*), *Salmonella* (specific examples include *Salmonella Typhi*, *Salmonella* paratyphi A, and *Salmonella enteritidis*), *Citrobacter*, *Klebsiella* (specific examples include *Klebsiella pneumoniae*), *Enterobacter*, *Serratia* (specific examples include *Serratia marcescens*), *Proteus*, *Providencia*, *Morganella*, *Yersinia* (specific examples include *Yersinia pestis*), *Vibrio* (specific examples include *Vibrio cholerae*, *Vibrio parahaemolyticus*, *Vibrio vulnificus*, and *Vibrio mimicus*), *Aeromonas*, *Pseudomonas* (specific example include *Pseudomonas aeruginosa*), *Acinetobacter* (specific examples include *Acinetobacter baumannii*), *Alcaligenes*, *Agrobacterium*, *Flavobacterium*, *Haemophilus* (specific examples include *Haemophilus influenzae*), *Pasteurella*, *Francisella*, *Bordetella* (specific examples include *Bordetella pertussis*), *Eikenella*, *Brucella*, *Streptobacillus*, *Actinobacillus*, *Legionella* (specific examples include *Legionella pneumophila*), *Bacillus* (specific examples include *Bacillus subtilis*, *Bacillus anthracis*, and *Bacillus cereus*), *Corynebacterium* (specific examples include *Corynebacterium diphtheriae*), *Lactobacillus*, *Listeria*, *Erysipelothrix*, *Nocardia*, *Actinomyces*, *Clostridium* (specific examples include *Clostridium perfrin-*

*gens* and *Clostridium sporogenes*), *Bacteroides* (specific examples include *Bacteroides fragilis*), *Fusobacterium*, *Mycobacterium* (specific examples include *Mycobacterium tuberculosis*), *Campylobacter*, *Helicobacter* (specific examples include *Helicobacter pylori*), Spirillum, *Treponema, Borrelia*, Leptospira, Bacteria and fungi such as *Mycoplasma* (specific examples include *Mycoplasma pneumoniae*), *Aspergillus* (specific examples include *Aspergillus niger* and *Aspergillus brasiliensis*), and yeast (specific examples include *Candida albicans*), but microorganisms other than these may also be target to be detected.

The sample may not be particularly limited as long as it is a sample containing blood cells. In particular, a biological sample derived from a living body, a sample suspected of being contaminated by microorganisms, and the like are included. For example, the sample may be various samples such as blood, urine, bone marrow fluid, breast milk, amniotic fluid, biopsy tissue, cell culture fluid, and cell culture supernatant. In addition, the origin of the sample may not be particularly limited, and the sample may be derived from any species. For example, a sample derived from at least one of various kinds of organisms such as animals, plants, and insects may be used as the test sample. When the sample is a liquid sample, it may be used as it is or diluted or concentrated with a solvent. In the case of a solid sample, the sample may be suspended in a solvent or homogenized with a pulverizer or the like, or a supernatant obtained by stirring with a solvent may be used. The sample may be diluted with a suitable medium, physiological saline, or subjected to pretreatment or the like.

The term "collection" means separating microorganisms from a sample containing blood cells, concentrating the microorganisms contained in the sample, and the like. The concentration of microorganisms that may be contained in the sample is not particularly limited.

According to the present invention, a first container having at least one through hole in a side thereof and a second container capable of enclosing the through hole of the first container may be used in combination. The second container is to be connected to the first container via the through hole. According to the present invention, "enclosing and connecting (enclosed and connected)" means that the second container encloses the through hole of the first container, and the inside of the second container communicates with the inside of the first container through the through hole provided in the first container. The enclosing may be in such a manner that the second container encloses the entire first container including the through hole, or may be in such a manner that the second container encloses a part of the first container to cover the portion of the through hole of the first container.

As the first container, any container into which a sample can be introduced and subjected to centrifugation may be used. For example, the volume of the container may be 1 to 10 mL, preferably 3 to 5 mL. The material of the container may not be particularly limited as long as it is a material suitable for an operation such as centrifugal separation. For example, the container may preferably be made of a hydrophobic material. This is because when the affinity between the container and the sample is good, the sample may be released from the fine through hole before centrifugal separation because of surface tension. Examples of the container may include a container made of an acrylic resin, an ABS resin, polypropylene, polystyrene, polyethylene, or the like using a 3D printer or injection molding. The container may also be produced by cutting using aluminum or stainless steel. To obtain hydrophobicity, surface modification may be performed by chemically treating a microsample or the entire container. The container may be opaque, but when the container is transparent, it may be easy to visually recognize the internal state or to perform optical measurement and imaging with an apparatus, and it may be possible to detect clogging and foreign matters in the sample in addition to detection of excess or deficiency of the liquid amount. Thus, the container may preferably be transparent.

The shape of the first container may not be particularly limited as long as the through hole is enclosed by the second container, and a cylinder or a polygonal column (quadrangular prism, hexagonal prism, etc.) may typically be employed.

The first container may have at least one through hole in a side thereof. The size, position, and number of the through holes may be determined by those skilled in the art based on the description of the present specification and the common general technical knowledge according to conditions such as the type and amount of the target sample, the centrifugal acceleration to be adopted (first separation step), and whether to perform centrifugal separation in the second separation step (when performing, the centrifugal acceleration).

The size of the through hole may be set to, for example, have a diameter of 10 to 200 μm, preferably a diameter of 10 to 100 μm. The shape of the through hole is not limited, but may preferably be a round shape, an elliptical shape, a quadrangular shape, or the like. An appropriate size and shape may be set in combination with the sample to be used, the centrifugal acceleration, and the like as described above in the size and shape through which the component including microorganisms can pass. The sample may include red blood cells, white blood cells, and platelets, and among them, white blood cells are the largest in size, having a diameter of 6 to 30 μm. When the diameter of the through hole is smaller than this size, it is to be noted that there may be a case where the through hole is clogged with the blood cells and liquid is not released.

Regarding the position of the through hole, the through hole may preferably be provided at a height of ⅕ or more of the height of the container from the bottom surface of the container. The separation may be performed at a higher speed as the through hole is positioned on the upper side of the container, but the amount of microorganisms that can be collected decreases, and thus, in practice, it may be preferable that the through hole is provided at a height of ⅕ to ⅔ from the bottom surface. As a specific position, an appropriate position may be set together with the sample to be used, the centrifugal acceleration, and the like as described above. For example, when a blood culture sample is used as a sample, usually, the blood culture sample may contain a culture medium, a resin for adsorbing a drug, and the like in addition to blood. Since the blood culture sample is collected from a bottle using an injection needle, the collected sample does not contain resin, and 70 to 80% of the sample is a culture medium, and the rest is components derived from blood. The blood cell components in the blood are often about 30 to 55% depending on sex and health condition. That is, the ratio of the blood cell components in the blood culture sample may be about 15 to 20% at the maximum. Thus, it may be desirable that the through hole is at a height of ⅕ or more from the bottom surface of the container.

One through hole may be provided in one container, a plurality of through holes having the same diameter may be provided at the same height, or a plurality of through holes having the same or different diameters may be provided at different heights. When a plurality of through holes having different diameters are provided at different heights, it may be preferable to provide a through hole having a smaller diameter as the installation height of the through hole decreases. That is, the size (diameter) of the through hole may be reduced along the direction in which the acceleration of the centrifugal separation is applied. With such a configuration, when the acceleration of centrifugal separation is changed in several stages, the sample may be released in order from the through hole provided on the upper side, and thus, separation and discharge may efficiently be performed as compared with a case where there is one through hole, and rapid testing can be performed.

The length of the through hole may vary depending on the thickness of the first container. The thickness of the first container may be defined as follows. A practical optimum value of the through hole diameter may be in the range of 10 to 100 µm, and the thickness of the first container cannot be made too thick considering forming the through hole. For example, when the through hole is formed by cutting with a drill, the thickness of the container may preferably be up to 10 times the through hole diameter. Thus, the thickness of the container may preferably be in the range of approximately 100 to 1000 µm.

The through hole may preferably be provided perpendicular to a side direction of the first container. This configuration may maximize the effect of the capillary valve, and separation can be performed at the highest speed. However, it may be possible to achieve the effect of the present invention even when the through hole is directed from the vertical direction to the upward direction or the downward direction with respect to the side direction.

The second container may be sized, shaped, and made of a material capable of enclosing the through hole of the first container. The material may be the same as that described for the first container. Those skilled in the art can appropriately set the size and shape of the second container according to the size and shape of the first container.

The first container and the second container may preferably have a function that enables the containers to be detachable from each other. For example, the first container and the second container may be fixed by screws so as to be detachable from each other. This configuration may enable the two containers to be stably maintained even when centrifugal separation is performed with the through hole of the first container being enclosed within the second container.

The first container and/or the second container may be sealed. For example, a sealing plug or a rubber plug may be used to seal the container. In a preferred embodiment, at least the first container may be sealed by a seal.

The first container and/or the second container may be provided with a guard to prevent contamination by the sample into the second container from the other parts than the through hole of the first container. The guard may be provided in advance in the first container, may be provided in advance in the second container, or may be provided after the first container is enclosed within the second container. Sealing with a seal may be used as a guard to prevent contamination by a reagent into the sample.

In a method according to the present invention, a step of introducing a sample into the first container and a step of having the through hole of the first container to be enclosed within and connected to the second container are performed. The order of these steps may not be particularly limited. For example, a sample may be introduced into the first container, then the first container containing the sample may be connected to the second container, or the first container may be connected to the second container, then a sample may be introduced into the first container. An appropriate amount of the sample may be introduced according to the volume of the first container, the centrifugal acceleration to be adopted, and the like.

Subsequently, the first container and the second container may be subjected to centrifugation at a first centrifugal force. The first centrifugal force may be applied with a centrifugal acceleration at which liquid does not leak from the through hole of the first container. When the surface tension of liquid and the external force due to gravity are balanced inside the fine through hole, the liquid may not leak from the through hole (capillary valve effect). Such a first centrifugal force may be appropriately set according to the type of the sample to be used (affinity with the container), the size and position of the through hole, and the like (for example, Example 1). According to the present invention, the centrifugation with the first centrifugal force is also referred to as low-acceleration centrifugation. For example, when a blood sample is used as the sample, the first centrifugal force may be applied at a centrifugal acceleration of about 10 G or more and 100 G or less (when the diameter of the through hole is 50 µm), 200 G or less (when the diameter of the through hole is 40 µm), or 400 G or less (when the diameter of the through hole is 30 µm). By such centrifugal separation, blood cells such as red blood cells and white blood cells may rapidly settle because they are large, whereas microorganisms (bacteria), platelets, and other components may be contained in the supernatant phase. Thus, the sample can be separated into a solution containing microorganisms and a solution containing blood cells by the first separation step.

Thereafter, the solution containing microorganisms may be discharged from the through hole to the second container, and the solution containing microorganisms may be collected in the second container (second separation step). The second separation step may be performed, for example, by the following two methods. In an embodiment, the second separation step may include performing centrifugation on the first container and the second container at a second centrifugal force greater than the first centrifugal force. The second centrifugal force may be applied at a high centrifugal acceleration equal to or greater than the critical acceleration at which the capillary valve bursts. The second centrifugal force may also be appropriately set according to the type of the sample to be used (affinity with the container), the size and position of the through hole, and the like (for example, Example 2). According to the present invention, the centrifugation with the second centrifugal force is also referred to as high-acceleration centrifugation. For example, when a blood sample is used as the sample, the second centrifugal force may be applied at a centrifugal acceleration of about more than 100 G (when the diameter of the through hole is 50 µm), more than 200 G (when the diameter of the through hole is 40 µm), and more than 400 G (when the diameter of the through hole is 30 µm) (up to about 3000 G).

In another embodiment, the second separation step may include reducing a pressure inside the second container. For example, by reducing the pressure inside the second container by a vacuum pump, the solution containing microorganisms may be discharged from the through hole of the first container to the second container.

Separation of blood cells from a sample containing blood cells and collection of microorganisms can be thus performed. Cleaning or pipetting with a reagent by a user or another device is unnecessary, and microorganisms can be easily and rapidly collected.

In some embodiments, the second container may contain a reagent. In this embodiment, the method of the present invention includes, in the second separation step, destroying blood cells contaminated in the collected solution containing microorganisms with a reagent. This configuration can reliably destroy and remove blood cell components even when blood cells and the like are contaminated in the microorganisms collected as described above.

The reagent may not be particularly limited as long as it can destroy blood cells without affecting the growth of microorganisms. For example, the reagent may contain at least one surfactant. Examples of the surfactant may include, but are not limited to, an anionic surfactant having a hydrophilic and hydrophobic moiety and the hydrophobic moiety being a chain hydrocarbon, a surfactant having a hydrophilic and hydrophobic moiety and the hydrophobic moiety being a cyclic hydrocarbon, or a combination of both. Specifically, examples of the former may include sodium dodecyl sulfate, lithium dodecyl sulfate, and sodium N-lauroyl sarcosine, and examples of the latter may include saponin, sodium cholate, sodium deoxycholate, 3-[(3-cholamidopropyl)dimethylammonio]-1-propanesulfonate, and 3-[(3-cholamidopropyl)dimethylammonio]-2-hydroxy-1-propane sulfonate. Separation of blood cells from a sample containing blood cells, destruction of blood cells, and collection of microorganisms can be thus continuously performed.

In another aspect, the present invention provides a method for determining a proliferation degree of microorganisms contained in a sample, the method including the steps of:
collecting microorganisms contained in a sample by the above method;
preparing a microbial liquid having a target concentration by using the microorganisms that are collected; and
determining a proliferation degree of the microorganisms by using the microbial liquid.

After the microorganisms contained in the sample are collected by the above method, a microbial liquid (bacteria liquid) having a target concentration is prepared. The microorganisms may be used as they are in the second container, or may be used by being dispensed from the second container to another container. Dispensing can be performed using methods and means conventionally performed in the technical field, and for example, a method of directly obtaining a pellet of microorganisms with a syringe, a method of removing a supernatant of a pellet of microorganisms with a syringe or the like and collecting microorganisms, a method of using a filter (for example, a filter having a pore diameter of about 0.1 to 1 μm), or the like may be adopted. The collected microorganisms may be introduced into a liquid (selected depending on the type of sample and microorganism species that may be contained) such as physiological saline or a medium to prepare a microbial liquid (bacteria liquid), and the microbial liquid may be stirred as necessary.

The concentration of the microbial liquid may be measured, and the concentration may be adjusted to a desired value as necessary. The concentration of microorganisms may be measured using methods and means conventional in the technical field, for example, by measuring turbidity. When the concentration is equal to or greater than a desired value, a liquid such as physiological saline or a medium may be added.

Subsequently, the proliferation degree of microorganisms may be determined using the microbial liquid. Determination of proliferation degree of microorganisms may also be performed using methods and means conventional in the technical field. Examples thereof include a method of optically determining an increase in the number of microorganisms and detecting the proliferation degree, a method of measuring an absorbance change due to scattering of microorganisms (for example, a lamp, an LED, a laser light source, or the like is used), and a method of directly observing microorganisms using a microscope and counting the number of microorganisms in a microscopic image.

As an example of the proliferation degree determination, in the case of a sensitivity test, by mixing a microbial liquid adjusted to a certain concentration and drugs (for example, antibiotics) at various concentrations and determining the proliferation degree of microorganisms, the effectivity of the drug against the microorganisms can be determined. According to the method of the present invention, it may be possible to continuously perform a plurality of times of separation, destruction, and centrifugal separation, which are conventionally necessary, and it may be possible to shorten the time required for determining the proliferation degree of microorganisms and performing a drug sensitivity test.

In still another aspect, the present invention is related to a kit, especially a kit for use in collection of microorganisms, the kit including:
a first container into which a sample is to be introduced, the first container having at least one through hole in a side thereof; and
a second container having a part into which a reagent is to be introduced,
in which the through hole of the first container is enclosed within and connected to the second container.

Details of the first container and the second container are as described above. For example, the through hole of the first container (a) may have a diameter of 10 to 200 μm and/or (b) may be provided at a height of ⅕ or more of the height of the first container.

The first container may preferably be disposed on an inner side than the second container with respect to the direction in which centrifugal force is applied.

A reagent may be introduced in advance into the part of the second container into which the reagent is to be introduced. In this case, the user only needs to introduce the sample into the first container, and can use the kit simply and rapidly.

The kit of the present invention may be used, for example, as a kit for use in collection of microorganisms in a sample containing blood cells, a kit for carrying out the method of the present invention described above, and the like.

Further in the fourth aspect, the present invention is related to a microorganism collecting apparatus including:
a centrifuge configured to perform centrifugation on a first container and a second container together; and
a control unit configured to control centrifugal force of the centrifuge,
in which
the first container comprises at least one through hole in a side thereof, and a sample is to be introduced into the first container,
the second container is configured to enclose and connect to the through hole of the first container, and
the control unit is configured to control the centrifugal force of the centrifuge to perform:
a first separation using a first centrifugal force that separates the sample introduced into the first container into a solution containing microorganisms and a solution containing blood cells, and a second separation using a second centrifugal force greater than the first centrifugal force, the second separation causing the solution containing microorganisms to be discharged from the through hole of the first container to the second container following the first separation.

A microorganism collecting apparatus of the present invention may comprise at least a centrifuge and a control unit. As the centrifuge, any centrifuge may be used as long as the centrifuge can perform centrifugation on the first container and the second container enclosing and connecting to the through hole of the first container together. The centrifugal force of the centrifuge may be controlled by the control unit in such a manner that the first separation using the first centrifugal force and the second separation using the second centrifugal force may be performed. Details of the first centrifugal force and the second centrifugal force are as described above.

The details of the first container and the second container, the sample being introduced into the first container, and the second container optionally including a reagent are also as described above.

The apparatus of the invention may further comprise:
a dispensing device configured to dispense microorganisms, wherein the control unit is configured to control the dispensing device to dispense microorganisms discharged into the second container, and/or
an optical measurement device configured to measure a concentration of microorganisms, wherein the control unit controls the optical measurement apparatus to measure a concentration of microorganisms discharged into the second container and/or a concentration of microorganisms dispensed into another container, and/or
an imaging device, wherein the control unit controls the imaging device to image microorganisms in the second container and/or microorganisms dispensed into another container and/or microorganisms grown in another container, and/or
a display unit, wherein the control unit controls the display to display presence or absence of completion of the dispensing, a measured microorganism concentration, a result of the imaging, and the like.

By using the kit and/or the apparatus of the present invention, it may be possible to more easily and rapidly implement the microorganism collecting method and the microorganism proliferation degree determining method of the present invention described above.

EXAMPLES

Hereinafter, specific embodiments of the present invention will be described with reference to the drawings.

Although the accompanying drawings illustrate specific embodiments based on the principles of the present invention, these are for the understanding of the present invention, and are not used to interpret the present invention in a limited manner. In the embodiments and all the drawings for describing the embodiments, components having the same function are denoted by the same reference numerals, and repeated description thereof will be omitted.

In the following Examples, a method, a container, and an apparatus for collecting bacteria as microorganisms from a blood sample as a sample will be described.

Example 1

In the present Example, a method will be described in which centrifugal separation of a sample is performed using a container having a fine through hole, and separation and discharge of blood cells and liquid components are continuously performed.

In Example 1, a container as shown in FIG. 1 was used. A first container 11 has a hexagonal prism shape in the present Example, but it may have a shape such as a cylinder or another polygonal prism. One fine through hole 12 is provided in one side. The volume of the container was about 6 mL, the thinnest portion was 0.3 mm, and through holes under three conditions ($\Phi$=30, 40, 50 µm) having different diameters were provided at a position half the height of the container. A sample was placed in the container 11 and subjected to centrifugal separation. A general-purpose centrifuge was used, and in the present Example, the rotation radius was set to a fixed value of 75 mm.

Figure 2:
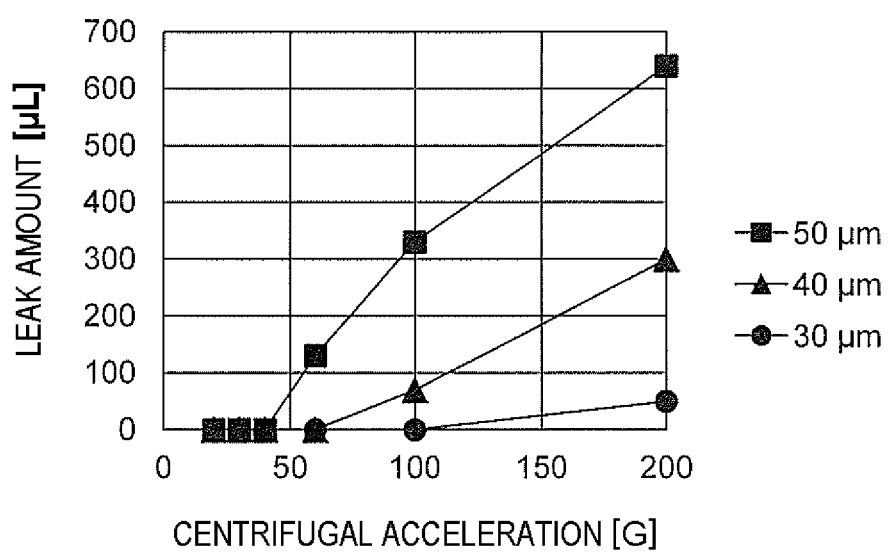
FIG. 2 is a graph showing results relating to the volume of pure water leaking from the through hole when the container with the fine through hole is subjected to centrifugal separation and the centrifugal acceleration.

FIG. 2 shows the results of performing centrifugal separation for 5 minutes at different centrifugal accelerations (20 G, 30 G, 40 G, 60 G, 100 G, and 200 G) using 6 mL of pure water as a sample. First, when the size of the through hole was, for example, 200 µm or less, pure water did not leak from the through hole when the container was allowed to stand under gravity without centrifugal separation. This is because the surface tension of the liquid and the external force due to gravity are balanced inside the fine through hole, and thus, the liquid does not leak from the fine through hole. This effect is called capillary valve.

When the size of the through hole was 50 µm, the liquid did not leak from the fine through hole when the centrifugal acceleration was 20 to 40 G. However, when the centrifugal acceleration was further increased (60 G or more), the liquid started to leak, and the discharge amount increased in proportion to the centrifugal acceleration. This means that when the centrifugal acceleration is 60 G, the surface tension of the liquid, the gravity force, and the external force caused by centrifugation are not balanced, and the liquid does not function as a valve. This state is expressed as a burst state. The tendency may be the same even when the diameter of the through hole is changed, but the bursting centrifugal acceleration and the diameter of the hole may have a semi-proportional relationship.

Figure 3:
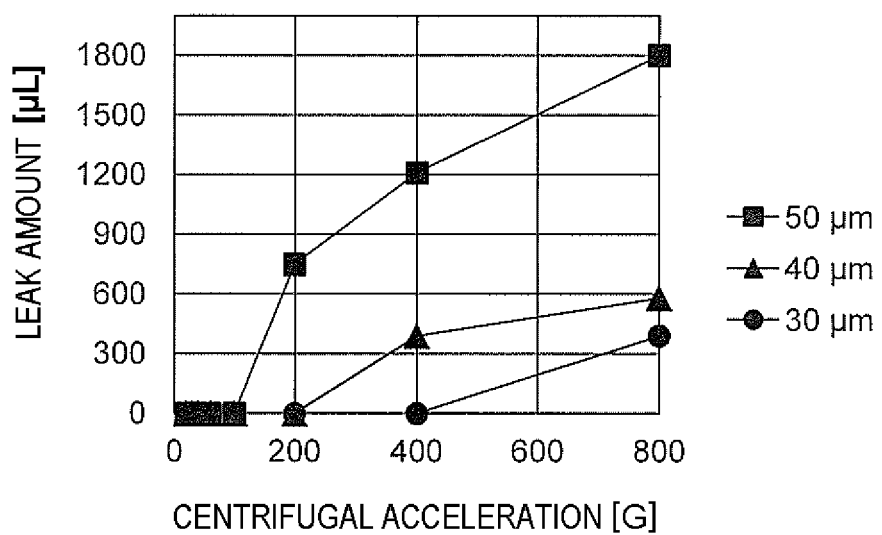
FIG. 3 is a graph showing results relating to the volume of blood leaking from the through hole when the container with the fine through hole is subjected to centrifugal separation and the centrifugal acceleration.

FIG. 3 shows the results of performing centrifugal separation for 5 minutes at different centrifugal accelerations (20 G, 30 G, 40 G, 60 G, 100 G, 200 G, 400 G, and 800 G) using 6 mL of a blood sample as a sample. The blood sample is assumed to be a sample of a blood culture, and the sample contains a culture medium component and a bacterial component in addition to blood. The tendency of the results may be similar to that in the case of using pure water as a sample, but the burst centrifugal acceleration is higher than that in the case of pure water. This is because pure water and blood have different affinity with the container used this time.

Figure 4:
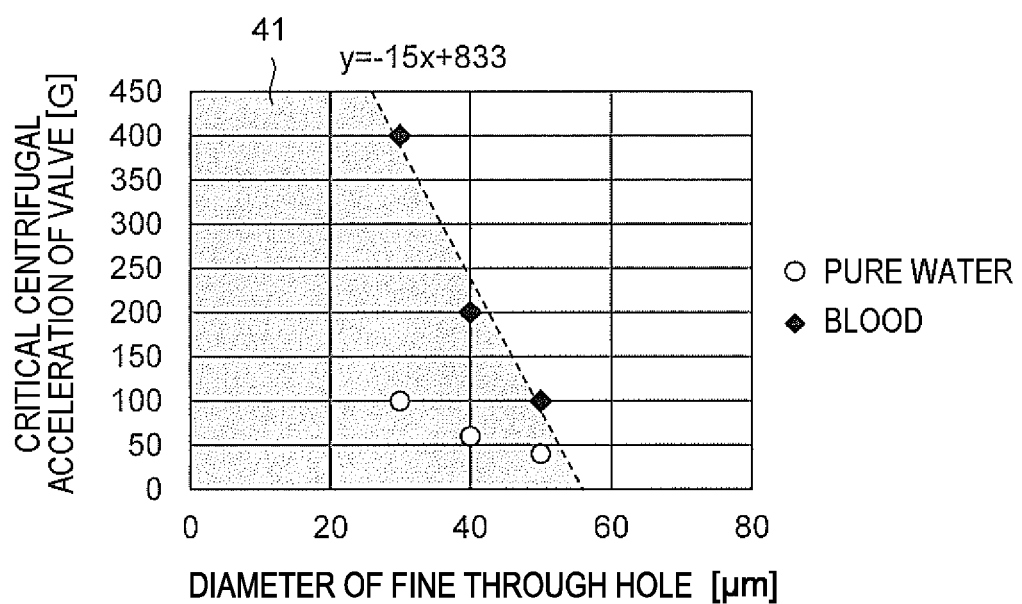
FIG. 4 is a graph showing a relationship between the critical centrifugal acceleration at which liquid bursts from the fine through hole and the through hole diameter.

FIG. 4 shows the relationship between the critical centrifugal acceleration at which liquid bursts from the fine through hole and the through hole diameter. When the sample is pure water, the liquid may be held in the container when the centrifugal acceleration and the through hole diameter satisfy the range 41 of the condition in which the liquid does not burst (indicated by hatching). When the sample is blood, the relational expression between the critical centrifugal acceleration Gc [g] and the through hole diameter d [µm] is Gc=−15d+833 with linear approximation (in the diagram, Gc is represented by y, and d is represented by X). Since the coefficient of this relational expression may vary depending on the affinity between the container and the sample, the shape and/or volume of the container, the number and/or position (height) of through holes, and the like, the centrifugal acceleration may be obtained depending on the through hole diameter if the coefficient is obtained by an experiment performed in advance.

Figure 5:
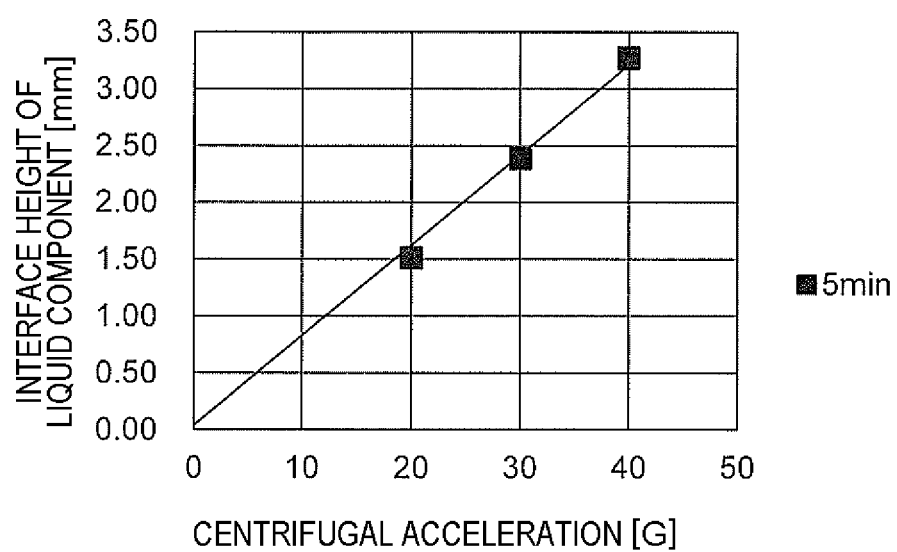
FIG. 5 is a graph showing the height of an interface of a liquid component separated when blood is subjected to centrifugal separation for a certain period of time.

Even when the sample is held in the container, centrifugal force may act on the sample, and an object having a large specific gravity in the sample may move to the bottom of the container. FIG. 5 shows the height of the liquid component obtained when 6 mL of a blood sample was subjected to centrifugal separation at a low centrifugal acceleration (20 G, 30 G and 40 G) for 5 minutes. Since red blood cells and white blood cells are precipitated at a higher speed by centrifugal separation, plasma, a culture medium, bacteria, and platelets having a light specific gravity may be contained in this liquid component. When centrifugal separation is performed at a low acceleration like this, the sample may not leak from the through hole, and only separation is performed, and the sample may be separated into blood cells and a liquid component containing bacteria. Thereafter, when centrifugal separation is continuously performed at a high acceleration, the sample can be released, and the next processing can be performed without interrupting the step.

Here, the optimum value of the fine through hole 12 and the optimum value of centrifugal separation will be examined. Blood includes red blood cells, white blood cells, and platelets, and among them, white blood cells is the largest in size, having a diameter of 6 to 30 μm. When the diameter of the through hole is smaller than this size, it is to be noted that there may be a case where the through hole is clogged with the blood cells and liquid is not released, not because of the capillary effect. Thus, depending on the surface affinity between the sample and the container, the practical range of the optimum value of the through hole diameter may be 10 to 100 μm in continuously separating and discharging blood cells and a liquid component. In addition, the critical value of the centrifugal acceleration at which liquid bursts may be automatically determined from the relationship illustrated in the graph of FIG. 4. For example, when the through hole diameter is 50 μm, centrifugal separation at 100 G may enable separation of blood cells and a liquid component at the highest speed under the condition that the sample is not released outside the container.

In the present description, the description has been made on the condition that only one fine through hole 12 is provided. However, even when a plurality of through holes are provided, the same effect can be obtained, and when a sample is discharged, the sample can be discharged at a higher speed and even when the through hole is clogged by impurities or the like, stable separation and discharge can be continuously performed. The effect of capillary valve may be maximized and the separation can be performed at the highest speed when the through hole is provided in the direction perpendicular to the centrifugal separation direction. However, the same effect can be obtained when the through hole is not provided perpendicularly but provided obliquely.

Example 2

The present Example shows a method in which a container provided with a fine through hole is combined with a container enclosing the container or the through hole and including a surfactant, a blood sample is placed in the container provided with the through hole, centrifugal separation is performed, separation of blood cells and bacteria from the blood sample, destruction of blood cells, and collection of bacteria are continuously performed by changing the centrifugal acceleration in stages, and a bacteria liquid having a target concentration is adjusted with the collected bacteria.

Figure 6:
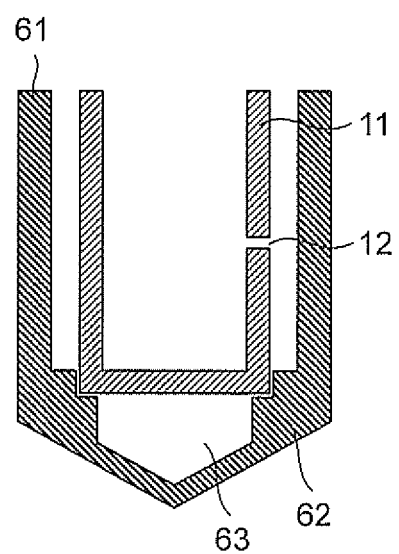
FIG. 6 is a sectional view of an example of a container configuration for continuously performing separation of blood cells and bacteria, destruction of blood cells, and collection of bacteria.

In Example 2, a container as shown in FIG. 6 was used. The container comprises the first container 11 having a fine through hole 12 and a second container 61 enclosing the first container. To perform centrifugation on the two containers together, it may be desirable that the second container 61 has a support 62 for horizontally supporting the first container 11. It may be desirable that there is a space 63 between the first container 11 and the second container 61 to introduce the sample discharged from the fine through hole 12.

Figure 7:
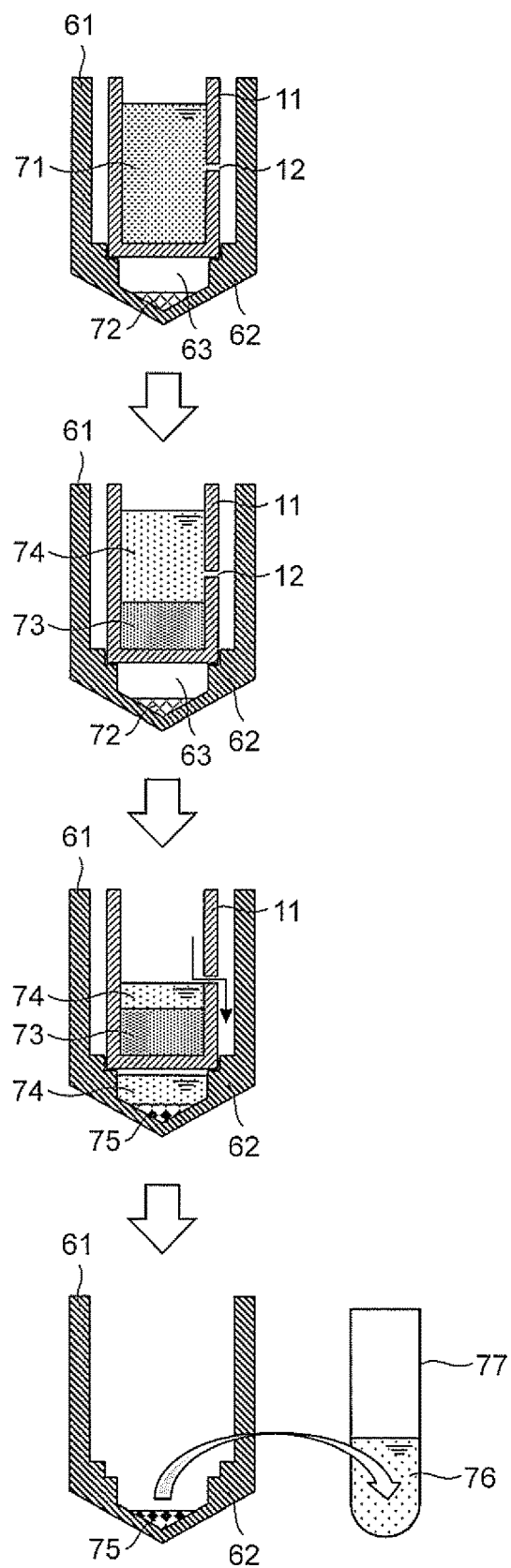
FIG. 7 is a diagram showing an example of a procedure of continuously performing separation of blood cells and bacteria, destruction of blood cells, and collection of bacteria and adjusting the concentration of a bacteria liquid.

According to the conditions based on the results of Example 1, separation of blood cells and bacteria from the blood sample, destruction of blood cells, and collection of bacteria were continuously performed, and the concentration of bacteria was adjusted. FIG. 7 illustrates the procedure. First, a surfactant 72 for destroying blood cells was placed in the second container 61. The blood sample 71 in an amount of 6 mL was put into the first container 11, and the two containers were stacked and put into a centrifuge. In Example 2, the diameter of the through hole 12 was set to 50 μm, and one through hole was provided at a position half the height of the first container 11. The volume of the first container is about 6 mL.

Next, the container containing the sample was subjected to centrifugal separation at a low acceleration. Specifically, centrifugal separation was performed at a centrifugal acceleration of 100 g at which the sample was not released from the fine through hole. The blood sample 71 was thus separated into a blood cell component 73 and plasma and medium component containing bacteria 74. Centrifugal separation at a low acceleration may preferably be performed until the interface position between the blood cell components and the plasma and medium component containing bacteria is lower than the position of the fine through hole 12, and for example, centrifugal separation may be performed for 5 minutes.

Centrifugal separation at a low acceleration is followed by separation of the plasma and medium component containing bacteria 74. In the present Example, a case where centrifugal separation at a high acceleration is performed will be described. When centrifugal separation is performed at an acceleration equal to or higher than the critical acceleration at which the capillary valve bursts, for example, 1500 g, the plasma and medium component containing bacteria 74 can be released from the through hole 12 to the outside of the first container 11. The released sample may move in the bottom direction of the second container 61 through centrifugal separation and may be mixed with the surfactant 72. The released sample includes red blood cells, white blood cells, and platelets that have not completely removed by centrifugal separation, but they are destroyed by the surfactant. Then, bacteria 75 collected may be formed as a pellet on the bottom surface of the container by centrifugal separation at a high acceleration, and the concentration of the bacteria liquid can be adjusted using the bacteria. The centrifugal separation at a high acceleration may preferably be performed until the blood sample is discharged to the position of the fine through hole, and for example, the centrifugal separation may be performed for 7 minutes. Since the series of steps of the blood cell separation, discharge, and blood cell destruction described above may be continuously performed only by changing the centrifugal separation acceleration of the apparatus, it may be possible to perform rapid testing without labor.

Finally, the first container 11 containing the separated blood cells may be removed, and bacteria may be introduced into a third container 77 containing a liquid 76 such as a culture medium or physiological saline necessary for preparing a bacteria liquid, whereby a bacteria liquid containing less impurities such as blood cells can be obtained. Since there is almost no substance having absorption of light at a specific wavelength such as hemoglobin in this bacteria liquid, the concentration of bacteria can be adjusted by light measurement, and for example, the concentration of the bacteria liquid can be adjusted by McFarland's nephelometry.

Figure 8:
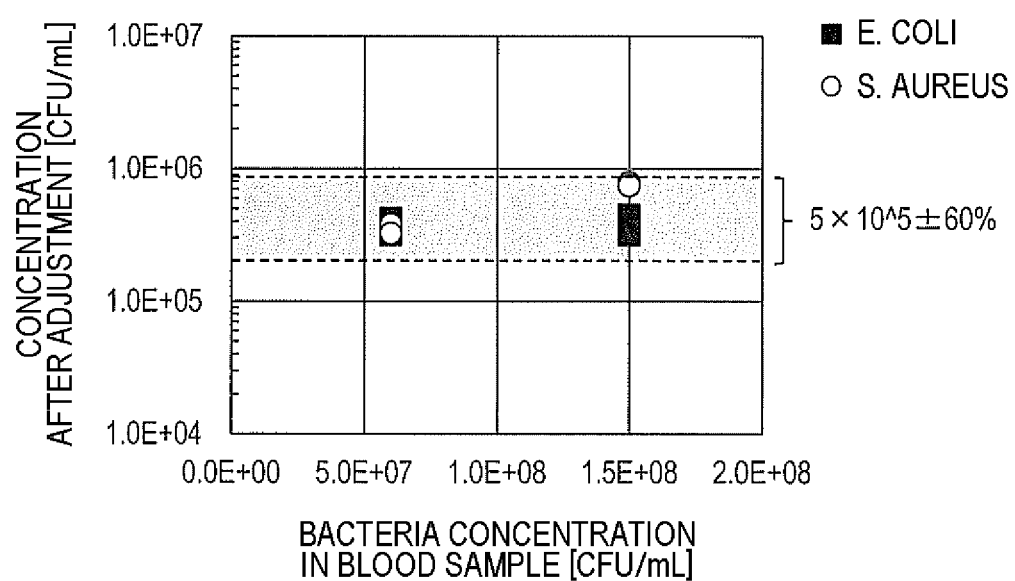
FIG. 8 is a diagram showing results of performing concentration adjustment of bacteria prepared from a blood sample according to Example 2.

FIG. 8 shows the results of adjusting the concentration of bacteria from a blood sample using the method of Example 2 and McFarland nephelometry. As the bacteria contained in the blood sample, *Escherichia coli* (*E. coli*) and *Staphylococcus aureus* (*S. aureus*) were used. Considering a specimen of a positive blood culture, normally, a blood sample may contain bacteria in the range of $10^6$ to $10^{10}$ CFU/mL. The results in FIG. 8 indicate that the concentration of the bacteria liquid can be correctly adjusted (vertical axis in FIG. 8) even when the bacteria contained in the blood sample have different concentrations (horizontal axis in FIG. 8), and the concentration can be adjusted without any problem even for bacteria of different bacterial species such as *Escherichia coli* and *Staphylococcus aureus*. A typical bacteria liquid used for a sensitivity test needs to be adjusted to have a concentration within the range of $5 \times 10^5$ CFU/mL±60%, and the result of Example 2 falls within this range, which means that the adjusted bacteria liquid can be used for the sensitivity test.

With the above method, separation of blood cells and bacteria from a blood sample, destruction of blood cells, and collection of bacteria can be continuously performed, and a bacteria liquid can be rapidly adjusted to have a target concentration. Since the series of steps described in Example 2 is performed only by changing the acceleration of centrifugal separation, it may be possible to perform rapid testing without requiring repeated cleaning and pipetting. Specifically, in the methods of PTL 1 and NPL 1, the process often takes 25 minutes or more, but in the method of Example 2, the process may be completed in 12 minutes. It may also be possible to simultaneously process a plurality of containers into which a plurality of different samples are introduced, and if the process is performed in parallel, it may be possible to perform testing with higher throughput.

Here, the acceleration of centrifugal separation for separating blood cells and a liquid component may be automatically determined when the diameter of the fine through hole is determined from the relational expression as shown in FIG. 4. When the diameter of the through hole is in the range of 30 to 50 μm, the optimum centrifugal separation acceleration for separating blood cells and liquid components is 400 to 100 g. When the acceleration of centrifugal separation at the time of discharging, destroying, and collecting the liquid may be as high as possible, the process can be performed at a higher speed. However, the centrifugal acceleration may preferably be as high as possible within the range of $10^4$ g or less in consideration of the possibility of affecting the growth of bacteria.

In the present Example, the sample was discharged from the fine through hole to the second container by increasing centrifugal acceleration to increase the external force acting on the sample. The application of the external force may not be necessarily performed by centrifugal separation. For example, the same effect as that of the present embodiment can be obtained when the sample is discharged from the first container to the second container by reducing the pressure inside the second container by a vacuum pump. In this case, it may be possible to reduce the acceleration required for centrifugal separation of the sample in the first container to several tens to several hundred G, and it may be possible to reduce the performance required for the centrifuge and to expect downsizing of the apparatus.

A surfactant was taken as an example of the reagent for destroying blood cells, but the reagent may not be a surfactant as long as the reagent can destroy blood cells without affecting the growth of bacteria.

Example 3

In Example 3, a method and an apparatus for preparing a bacteria liquid from a blood sample using the pretreatment of Example 2 and performing determination of proliferation will be described.

Figure 9:
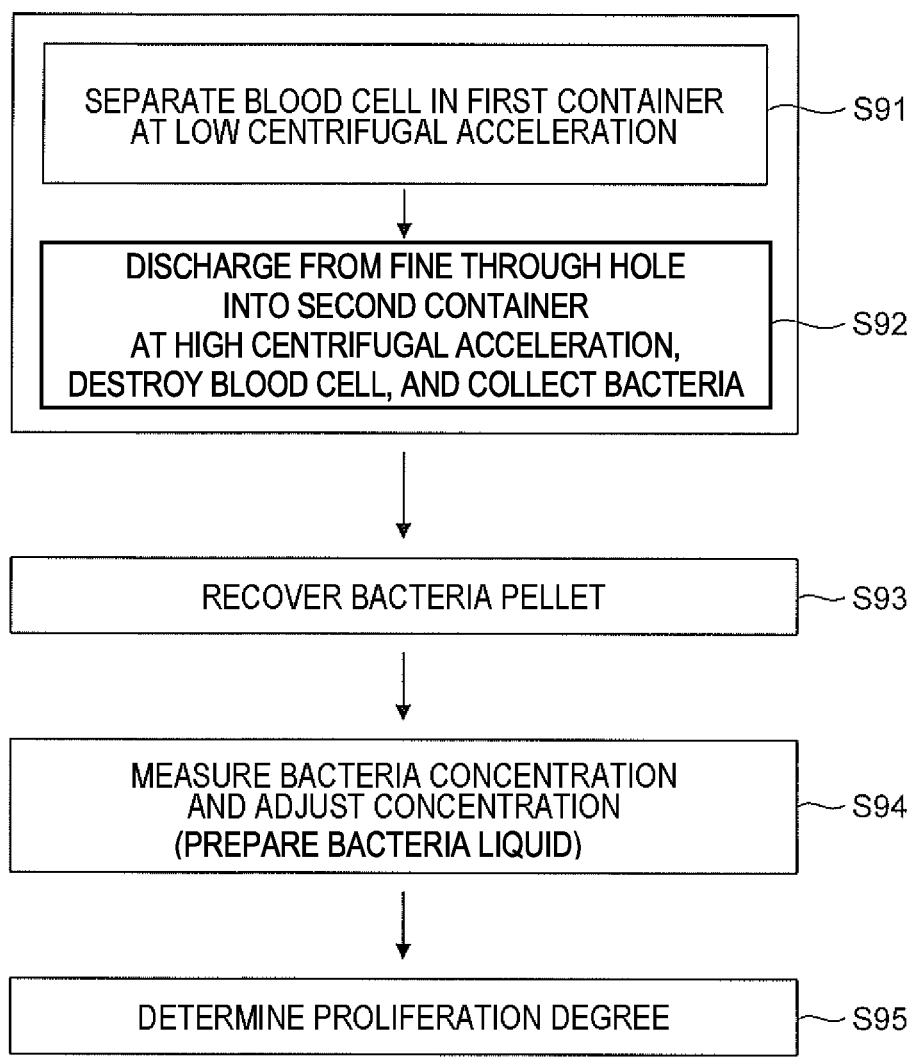
FIG. 9 is a diagram showing an example of a procedure for collecting bacteria from a blood sample and performing determination of proliferation.

FIG. 9 is a flowchart illustrating a method for preparing a bacteria liquid from a blood sample and performing determination of proliferation. First, the operator may introduce a blood sample into the first container. As in Example 2, it may be preferable that the first container and the second container are stacked in advance, and a surfactant may be introduced into the second container in advance. Depending on the sample, the pretreatment may not be performed correctly in some cases because of aggregation of blood cells and bacteria, and thus, it may be preferable to stir the sample well before introduction of the sample, for example by vortex or ultrasonic treatment.

The containers containing the sample may be installed in a centrifuge, and the process may be sequentially performed. In a step S91, blood cell separation may be performed in the first container by performing centrifugation at a low centrifugal acceleration.

Thereafter, in a step S92, centrifugation may be performed at a high centrifugal acceleration, then the sample may be discharged through a fine through hole and thereafter may react with the surfactant, whereby blood cells may be destroyed, and a pellet of bacteria may be formed at the bottom of the second container.

In a step S93, only the bacteria pellet may be recovered (dispensed). This is because a liquid remains on the upper part of the bacteria after completion of the process, and the liquid may contain the surfactant, hemoglobin, and the like in addition to plasma and a culture medium. These liquids are unnecessary at the time of preparing a bacteria liquid with little amount of impurities, and it may be necessary to collect only bacteria. As a simple method, a method of directly obtaining a bacteria pellet with a syringe or a method of removing a supernatant of a bacteria pellet with a syringe or the like and collecting the bacteria pellet may be considered. As another method for collecting bacteria, a method using a filter may be contemplated. For example, by using a filter having a pore size of 0.1 to 1 μm, only bacteria can be collected while removing liquid components. In this method, it may not be necessary to wash the syringe for each specimen or replace the tip of the syringe. The collected bacteria may be introduced into a liquid such as physiological saline or a culture medium and stirred.

In a step S94, the concentration of the bacteria liquid may be measured, and the concentration may be adjusted to a desired value as necessary. The concentration of bacteria may be measured by, for example, measurement of turbidity, and the concentration may be measured with a calibration curve indicating the relationship between the turbidity measured in advance and the number of bacteria, using the result of absorbance measurement at a wavelength of 400 to 600 nm. For example, such adjustment may be performed using an optical measurement device. When the concentration is equal to or greater than a desired value, a liquid such as physiological saline or a medium may be added.

In a step S95, which is the final step, the proliferation degree may be determined using the prepared bacteria liquid. For example, in the case of a sensitivity test, it may be possible to determine the effectivity of a drug against the bacteria by mixing the bacteria liquid adjusted to a certain concentration with drugs at various concentrations and determining the proliferation degree. There are various methods for determining the proliferation degree, and a typical method may be a method of optically determining the degree of increase in the number of bacteria and detecting the degree of proliferation. For example, there is a method of measuring an absorbance change due to scattering of bacteria by using a lamp, an LED, or a laser light source. There is also a method of directly observing bacteria using a microscope and counting the number of bacteria in a microscopic image, and this method can determine the proliferation relatively more rapidly than a method of measuring an absorbance change. In this case, an imaging device may be used for the proliferation degree determination.

Figure 10:
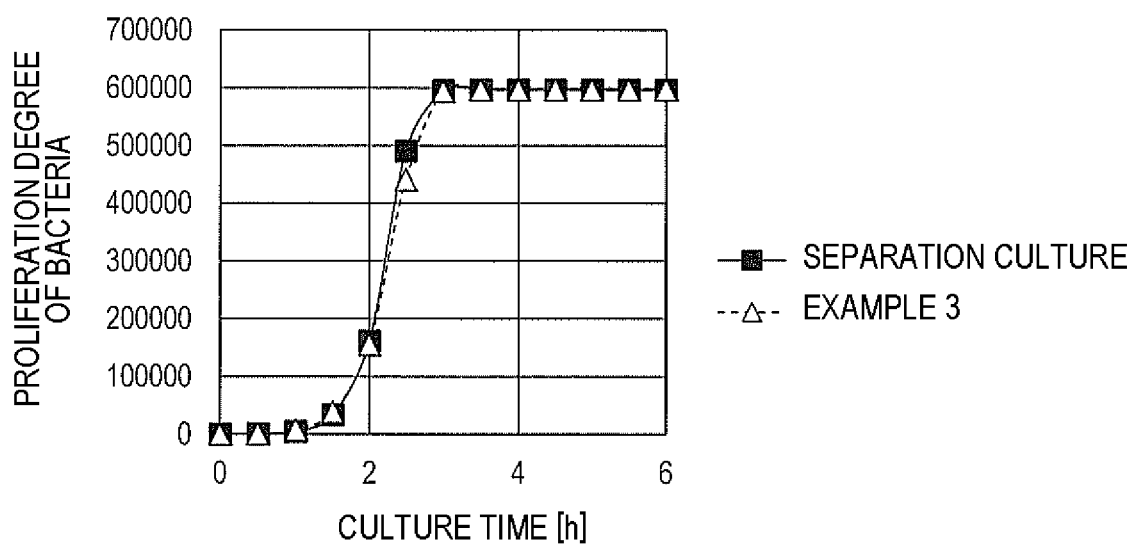
FIG. 10 is a graph showing results of collecting bacteria from a blood sample and performing determination of proliferation according to Example 3.

FIG. 10 shows an example of results of performing the treatment of Example 3, preparing a bacteria liquid from a blood sample, and performing determination of proliferation by microscopic observation. These results were obtained by using *Escherichia coli*, and the results obtained by using a bacteria liquid prepared from a single colony formed by overnight culture of separation culture (separation culture in FIG. 10) and a bacteria liquid prepared from a blood sample in pretreatment (Example 3 in FIG. 10) were compared. In the microscopic observation, the bacteria liquid and a culture medium were introduced into one well of a 96-well plate, and images were acquired every 30 minutes while culturing at 35° C. Thereafter, the value of area of bacteria representing the number of bacteria present in the image was mechanically calculated by image processing to determine the proliferation degree. The proliferation degrees of bacteria prepared by separation culture and bacteria prepared by the pretreatment of the present invention are almost the same. This indicates that the method of the present invention can obtain the same result as that of the conventional separation culture method. A current gold standard sensitivity test uses a method of performing separation culture, in which separation culture is performed all day and night after a blood culture becomes positive, and then determination of proliferation is performed. In the method of the present invention, it may be possible to replace the separation culture taking all day and night with pretreatment taking about 10 minutes, which leads to speeding up of the sensitivity test.

Figure 11:
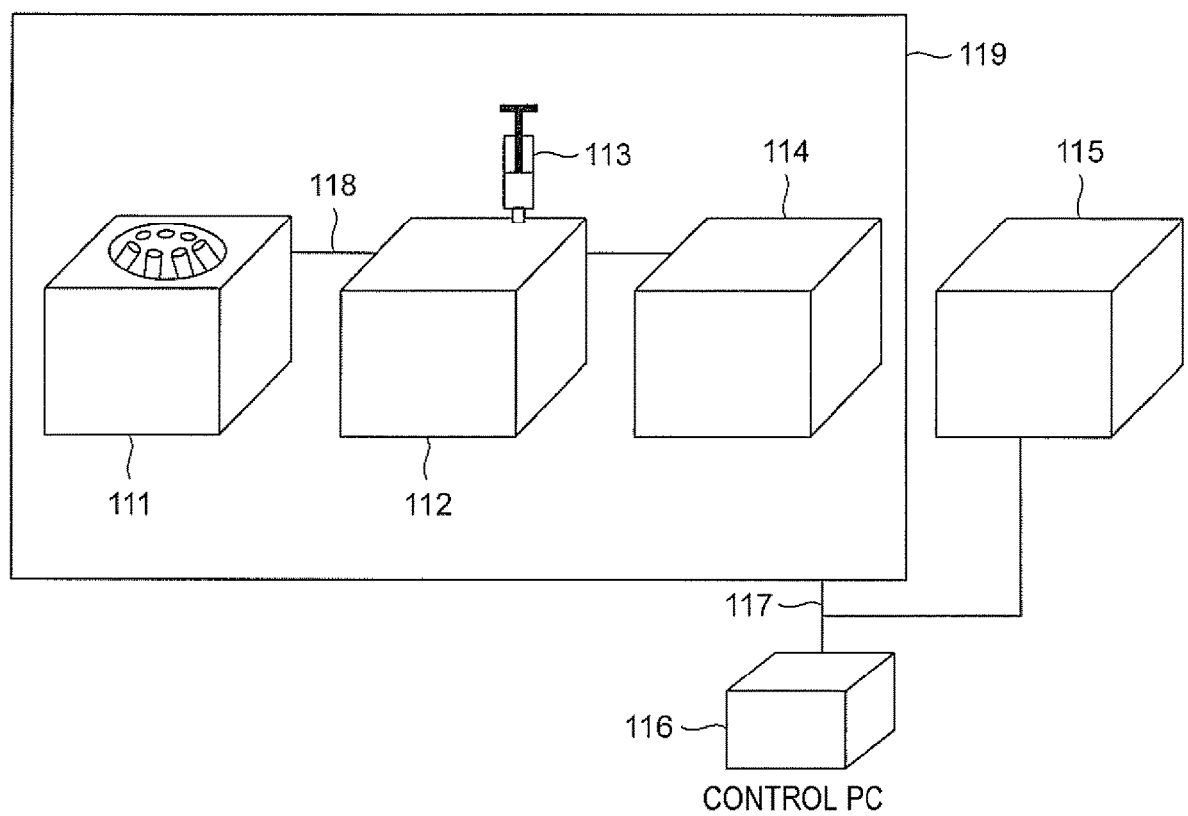
FIG. 11 is a diagram illustrating a configuration example of an apparatus of the present invention.

FIG. 11 illustrates a configuration example of the apparatus of the present invention. The apparatus comprises a centrifuge 111, a dispensing device 112, an optical measurement device 114, and an imaging device 115. The devices may be connected by a signal line 117, and their mechanism may be controlled by a control PC 116. In the centrifuge, pretreatment may be continuously performed with at least two centrifugal separation accelerations set for separation of blood cells or discharge, destruction, and collection of a sample, and the specimen may be sent to the dispensing device via a conveyance mechanism 118 after the treatment. In the dispensing device, bacteria may be collected by using, for example, a syringe 113. Thereafter, the concentration of the bacteria liquid may be measured by the optical measurement device. A combination of the centrifuge, the separation device, and the optical measurement device may be configured as a pretreatment device 119 like this.

The density (concentration) value measured by the pretreatment device 119 may be displayed on a display or the like attached to the control PC to notify the user of the density value. In a case where the density value is equal to or more than the target value, for example, the user may be notified, and the density may be adjusted to the target value by the user, which can maintain the reliability of the test. When the concentration is equal to or less than the target value, an error flag may be displayed, and the pretreatment may be performed again, or a method may be used in which the bacteria liquid is used after it is additionally cultured.

Typically, the specimen treated by the pretreatment device 119 may be once returned to the user, and the above-described additional treatment step or the like may be performed as necessary, then pipetting may be performed into the 96-hole plate or the like, and determination of proliferation may be performed by the imaging device 115. For example, it may be preferable that the imaging device 115 is mounted with an incubator necessary for culturing bacteria in addition to an optical system and a microscopic imaging system, and the temperature is adjusted to 35° C. The progress status and the determination result of the determination of proliferation degree may be displayed on an accompanying display on the control PC 116, and the user may be notified of the result. In addition, in the control PC 116, it may be preferable that parameters of each device such as the acceleration and time of centrifugal separation and the target value of the concentration of bacteria may be input according to the type of specimen, and the treatment content can be changed according to the values.

Example 4

In Example 4, features regarding the shape of the container and the position of the through hole for performing the pretreatment for collecting bacteria from a blood sample with higher reliability will be described.

Figure 12:
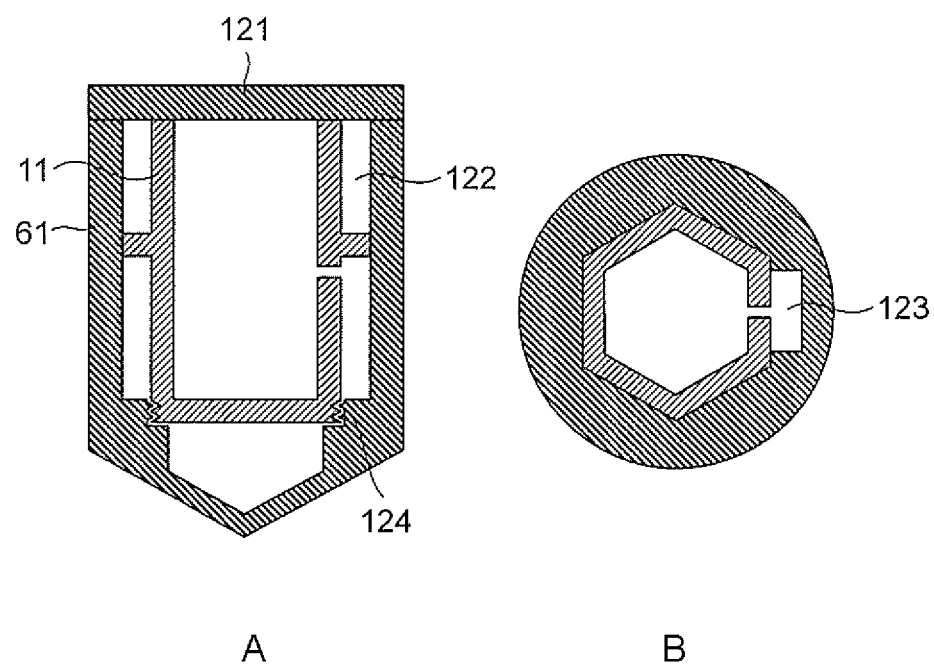
FIG. 12(A) is a side view.
FIG. 12(B) is a top view of an example of a feature of a container.

FIG. 12 shows a side view (A) and a top view (B) of an example of features of the container. It may be preferable that the container has a lid 121 that prevents contamination into other samples by leakage of liquid during centrifugal separation. For example, the lid may be a rubber or film sealing plug. In the case of a sealing plug, it may be possible to inject a sample by inserting a tip or an injection needle, and it may not be necessary to open or close the sealing plug at the time of pipetting, with which easy handling can be achieved.

It may also be preferable that there is a guard 122 for preventing contamination by a blood sample. This is a mechanism for preventing the blood sample from being erroneously mixed into the second container 61 when the blood sample is introduced into the first container 11, and the guard may be installed above the fine through hole. If the blood sample is mixed into the second container 61, an unseparated blood cell component may be mixed, and there may be a possibility that the concentration of bacteria is not correctly adjusted. In FIG. 12, the guard 122 for preventing contamination by the blood sample is provided in the first container 11, but there is no problem even when the guard is provided on the second container 61 side because the same effect can be obtained. When the bottom surface shape inside the second container 61 is curved toward the center of the container, bacteria may be likely to accumulate at the center, and the collected bacteria can be more efficiently captured.

Further, as illustrated in the top view (B) of FIG. 12, it may be preferable to provide a space 123 where no container support is present at a position where the fine through hole is present. This space may be for allowing the sample discharged from the through hole to smoothly flow in the bottom direction of the second container 61, and when a support, a wall surface of the container, or the like is present in the position, there may be a possibility that bacteria are trapped therein. The same applies to a case where a plurality of fine through holes are provided.

The container support for fixing the first container 11 and the second container 61 may be a mechanism capable of holding two containers. This mechanism may preferably be a container support 124 formed of a screw provided with a screw thread. For example, in a case where an external thread is provided on the bottom surface side of the first container 11 and an internal thread is provided on the inner side of the second container 61, the first container 11 and the second container 61 may be detachable from each other with a rotation mechanism, which makes it possible to obtain a structure suitable for automation with an apparatus.

Example 5

In Example 5, features regarding the shape of the container for more easily performing pretreatment for collecting bacteria from a blood sample will be described.

Figure 13:
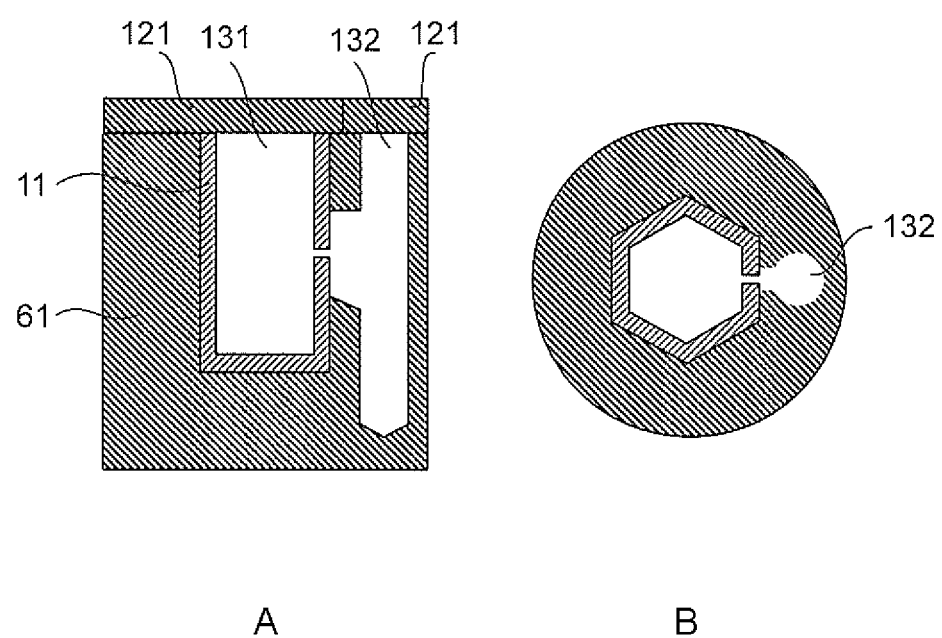
FIG. 13(A) is a side view.
FIG. 13(B) is a top view illustrating another feature of a container.

FIG. 13 shows a side view (A) and a top view (B) of an example of a feature of the container. A feature of this container is that the second container has a radially asymmetric shape. In the container having such a shape, a sample introduction unit 131 of the first container and a sample collection unit 132 of the second container may be provided at different positions. Thus, when the sample is collected, a step of removing the first container may be unnecessary, and bacteria can be collected as it is, which enables efficient pretreatment.

As in Example 4, it may be preferable that the sample introduction unit 131 and the sample collection unit 132 may be each individually covered with a lid 121, and a rubber plug or a sealing plug may be used. When the bottom surface shape inside the second container 61 is curved toward the center of the sample collection unit, bacteria may be likely to accumulate at the center, and the collected bacteria can be more efficiently captured.

The above description is summarized as follows. According to the present invention, it is possible to continuously perform separation of blood cells and bacteria, destruction of blood cells, and collection of bacteria from a sample such as a sample of a positive blood culture in which bacteria, blood components, a medium component, and the like are mixed, by having a first container having a fine through hole to be enclosed within and connected to a second container containing a surfactant, and performing centrifugal separation on them together. Thereafter, the concentration of a bacteria liquid may be adjusted, and determination of proliferation can be performed. As a result, it may be possible to realize sample preparation equivalent to bacteria liquid preparation from colonies by separation culture, which normally requires about all day and night, in about 10 minutes. In the known method, repeated centrifugal separation may be required because of a plurality of times of separation, destroying treatment, and washing steps, but in the present invention, a series of steps may be continuously performed, which makes it possible to shorten the testing time.

REFERENCE SIGNS LIST 11 first container
12 fine through hole
41 range of condition in which liquid is not discharged from fine through hole
61 second container
62 support
63 space
71 blood sample
72 surfactant
73 blood cell component
74 plasma and medium component containing bacteria
75 bacteria
76 liquid
77 third container
111 centrifuge
112 dispensing device
113 syringe
114 optical measurement device
115 imaging device
116 control PC
117 signal line
118 conveyance mechanism
119 pretreatment device
121 lid
122 guard for preventing contamination by blood sample
123 space where container support is not present
124 container support formed of screw
131 sample introduction unit
132 sample collection unit

The invention claimed is:

1. A method for collecting microorganisms, the method comprising:
   a step of introducing a sample into a first container having at least one through hole in a side thereof;
   a step of having the through hole of the first container to be enclosed within and connected to a second container;
   a first separation step of performing centrifugation on the first container and the second container with a first centrifugal force to separate the sample into a solution containing microorganisms and a solution containing blood cells; and
   a second separation step of discharging the solution containing microorganisms from the through hole to the second container to collect the solution containing microorganisms in the second container.

2. The method according to claim 1, wherein the second separation step comprises performing centrifugation on the first container and the second container with a second centrifugal force greater than the first centrifugal force, thereby causing the solution containing microorganisms to be discharged from the through hole to the second container.

3. The method according to claim 1, wherein the second separation step comprises reducing a pressure inside the second container, thereby causing the solution containing microorganisms to be discharged from the through hole to the second container.

4. The method according to claim 1, wherein the through hole:
   (a) has a diameter of 10 to 200 µm, and/or
   (b) is provided at a height of ⅕ or more of a height of the first container.

5. The method according to claim 1, wherein the sample is a blood sample.

6. The method according to claim 1, wherein the microorganisms comprise at least one microorganism selected from bacteria, fungi, and actinomycetes.

7. The method according to claim 1, wherein
the second container comprises a reagent, and
the second separation step comprises destroying, with the reagent, blood cells contaminated in the solution containing microorganisms that is collected.

8. The method according to claim 7, wherein the reagent comprises at least one surfactant.

9. A method for determining a proliferation degree of microorganisms contained in a sample, the method comprising the steps of:
collecting microorganisms contained in a sample by the method according to claim 1;
preparing a microbial liquid having a target concentration by using the microorganisms that are collected; and
determining a proliferation degree of the microorganisms by using the microbial liquid.

10. A microorganism collecting apparatus comprising:
a centrifuge configured to perform centrifugation on a first container and a second container together; and
a control unit configured to control centrifugal force of the centrifuge,
wherein
the first container comprises at least one through hole in a side thereof, and a sample is to be introduced into the first container,
the second container is configured to enclose and connect to the through hole of the first container, and
the control unit is configured to control the centrifugal force of the centrifuge to perform:
a first separation using a first centrifugal force that separates the sample introduced into the first container into a solution containing microorganisms and a solution containing blood cells; and
a second separation using a second centrifugal force greater than the first centrifugal force, the second separation causing the solution containing microorganisms to be discharged from the through hole of the first container to the second container following the first separation.

11. The apparatus according to claim 10, wherein
the second container comprises a reagent, and
after the solution containing microorganisms is discharged into the second container, blood cells contaminated in the solution containing microorganisms are destroyed by the reagent.

* * * * *